US 9,668,397 B2

United States Patent
Davis et al.

(10) Patent No.: US 9,668,397 B2
(45) Date of Patent: Jun. 6, 2017

(54) SYMMETRICAL BRUSH PATTERN GROOMER WITH INTEGRATED SPRING TINE RAKE

(71) Applicant: GreensGroomer WorldWide, Inc., Indianapolis, IN (US)

(72) Inventors: Michael E. Davis, Indianapolis, IN (US); James R. Hanson, Brownsburg, IN (US)

(73) Assignee: GreensGroomer WorldWide, Inc., Indianapolis, IN (US)

( * ) Notice: Subject to any disclaimer, the term of this patent is extended or adjusted under 35 U.S.C. 154(b) by 193 days.

(21) Appl. No.: 14/271,567

(22) Filed: May 7, 2014

(65) Prior Publication Data

US 2014/0262386 A1 Sep. 18, 2014

Related U.S. Application Data

(63) Continuation-in-part of application No. 13/796,106, filed on Mar. 12, 2013, now Pat. No. 9,179,588.

(51) Int. Cl.
A01B 45/00 (2006.01)

(52) U.S. Cl.
CPC .............. *A01B 45/00* (2013.01); *Y10S 56/12* (2013.01)

(58) Field of Classification Search
CPC ...................................... Y10S 56/12
USPC ........................ 172/197, 198, 199
See application file for complete search history.

(56) References Cited

U.S. PATENT DOCUMENTS

| 1,002,681 | A | * | 9/1911 | Hadford | A01B 39/04 172/431 |
| 1,247,999 | A | * | 11/1917 | Pascal | E02F 3/7627 172/155 |
| 1,473,457 | A | * | 11/1923 | Blood | E02F 3/7622 172/199 |
| 1,484,497 | A | * | 2/1924 | Hicks | E02F 3/7627 172/684.5 |
| 1,833,878 | A | * | 11/1931 | Adams | E01C 23/082 172/146 |
| 2,142,262 | A | * | 1/1939 | Beckham | E02F 3/7663 172/199 |
| 2,704,920 | A | * | 3/1955 | Fulper | A01B 19/02 172/622 |
| 3,245,479 | A | * | 4/1966 | Dlugosch | A01B 17/004 172/198 |
| 3,765,159 | A | * | 10/1973 | Neff | A01B 45/00 172/622 |

(Continued)

FOREIGN PATENT DOCUMENTS

| FR | WO 2012022855 | * 2/2012 | ............ A01B 45/00 |
| GB | 2 258 147 | 9/1994 | |

OTHER PUBLICATIONS

International Search Report—PCT/US2014/018858—GreensGroomer WorldWide, Inc.

*Primary Examiner* — Thomas B Will
*Assistant Examiner* — Joel F. Mitchell
(74) *Attorney, Agent, or Firm* — Woodard, Emhardt, Moriarty, McNett & Henry LLP

(57) ABSTRACT

An integrated brush-tine vehicle for brushing top dressing material between grass blades. The vehicle employs at least four brushes to contact each blade of grass located beneath the brush pattern of the vehicle. The vehicle includes adjustable tines to cooperatively work with the brushes to move the top dressing material down between grass blades.

4 Claims, 10 Drawing Sheets

(56) References Cited

U.S. PATENT DOCUMENTS

| | | | |
|---|---|---|---|
| 4,989,676 A | | 2/1991 | Rogers |
| 5,477,927 A | | 12/1995 | Figura |
| 5,535,831 A | | 7/1996 | Jacobs |
| 5,833,013 A | | 11/1998 | Davis |
| 5,918,684 A | | 7/1999 | Tozer |
| 6,164,386 A | * | 12/2000 | Delaurier ............... A01B 19/02 <br> 172/615 |
| 6,655,469 B1 | | 12/2003 | Davis |
| 7,065,947 B1 | * | 6/2006 | Street ..................... A01B 45/00 <br> 172/29 |
| 2004/0148718 A1 | | 8/2004 | Michel |
| 2006/0289177 A1 | * | 12/2006 | Cuadrado ................ A01G 1/12 <br> 172/21 |

* cited by examiner

SYMMETRICAL BRUSH PATTERN GROOMER WITH INTEGRATED SPRING TINE RAKE

BACKGROUND OF THE INVENTION

Field of the Invention

The present invention relates generally to the field of earth working devices and methods and more particularly those related to brushing or grooming grass.

Description of the Prior Art

Golf greens are maintained by applying a level of sand periodically atop the grass with a brush then being used to work the sand down between the blades of grass. The prior art includes a wheeled frame having a number of brushes depending therefrom with the frame then being towed by a vehicle back and forth across the green. The brushes are also used to groom fairway grass. One example of a grass brush vehicle is disclosed in U.S. Pat. No. 5,833,013.

The grass blades on a golf green are relatively close together with the result that it is sometimes difficult to work the sand down from the top of each blade towards the roots, particularly depending upon the humidity, moisture and other factors. Therefore, a brush vehicle is moved across the green in multiple passes. The additional labor time adds to the increased cost of maintenance. Disclosed herein is a grass brush vehicle and method which move the grass blades in different directions even though the brush vehicle makes a single pass over the golf green.

Brushes pulled across the ground have a normal tendency to provide a turning moment to the vehicle holding the brushes. Controlling the number of brushes on either side of the axis of vehicle movement greatly helps reducing the turning moment. Nevertheless, forces normally will exist causing the vehicle to veer off a straight line. The brush vehicle disclosed herein has a line of symmetry along the axis of movement by arranging the pattern of brushes on one side of the axis of movement being a mirror image of the pattern of brushes on the opposite side of the axis. Less force is required to pull the brush vehicle to move the brush vehicle while also ensuring the vehicle moves along a straight line.

A number of U.S. patents have issued relating to various brushes and other mechanisms for collection or movement of material. For example, the U.S. Pat. No. 5,918,684 discloses brushes for collecting debris from a surface. U.S. Pat. No. 5,535,831 discloses a sand distributor and spreader for filling, sand into aerated holes in golf greens. U.S. Pat. No. 5,477,927 discloses a turf maintenance and brushing machine particularly used with golf courses. U.S. Pat. No. 4,989,676 discloses a sweeper system for lawn mowing. U.S. Pat. No. 6,655,469 discloses a turf comber having a pattern of brushes for sweeping and combing the turf and also includes a tine device for combing the turf with spring biased coils. U.S. Pat. No. 5,018,857 discloses a brush attachment for grooming golf courses, athletic fields and alike. British Patent No. 2258147 discloses a ground effect brush wherein the brushes are divided into separate lengths that are mounted on a frame and arranged at an acute angle with respect to the intended direction of travel.

SUMMARY OF THE INVENTION

The preferred embodiment of the present invention is an integrated brush-tine groomer connectable to a towing vehicle for moving the groomer across a surface and working top dressing material into grass blades extending therefrom. A main frame has a front end and a rear end with a longitudinal axis of movement extending from the front end to the rear end. The frame is movable across a surface along the longitudinal axis of movement. Brushes are mounted to the frame and include bristles extending downward to work top dressing material between the grass blades extending from the surface as the frame is moved across the grass blades. The brushes are arranged in a first pattern extending on opposite sides of the longitudinal axis of movement which is an axis of symmetry of the first pattern with half of the brushes located on one side of the longitudinal axis of movement being arranged as a mirror image of the remaining half of brushes located on a side of the longitudinal axis of movement opposite of the one side. A connector is mounted to the front end of the frame and is connectable to a towing vehicle. Tines are mounted to the frame to contact the grass blades and cooperatively with the brushes work top dressing material between the blades.

DESCRIPTION OF THE PREFERRED EMBODIMENTS

Figure 1:
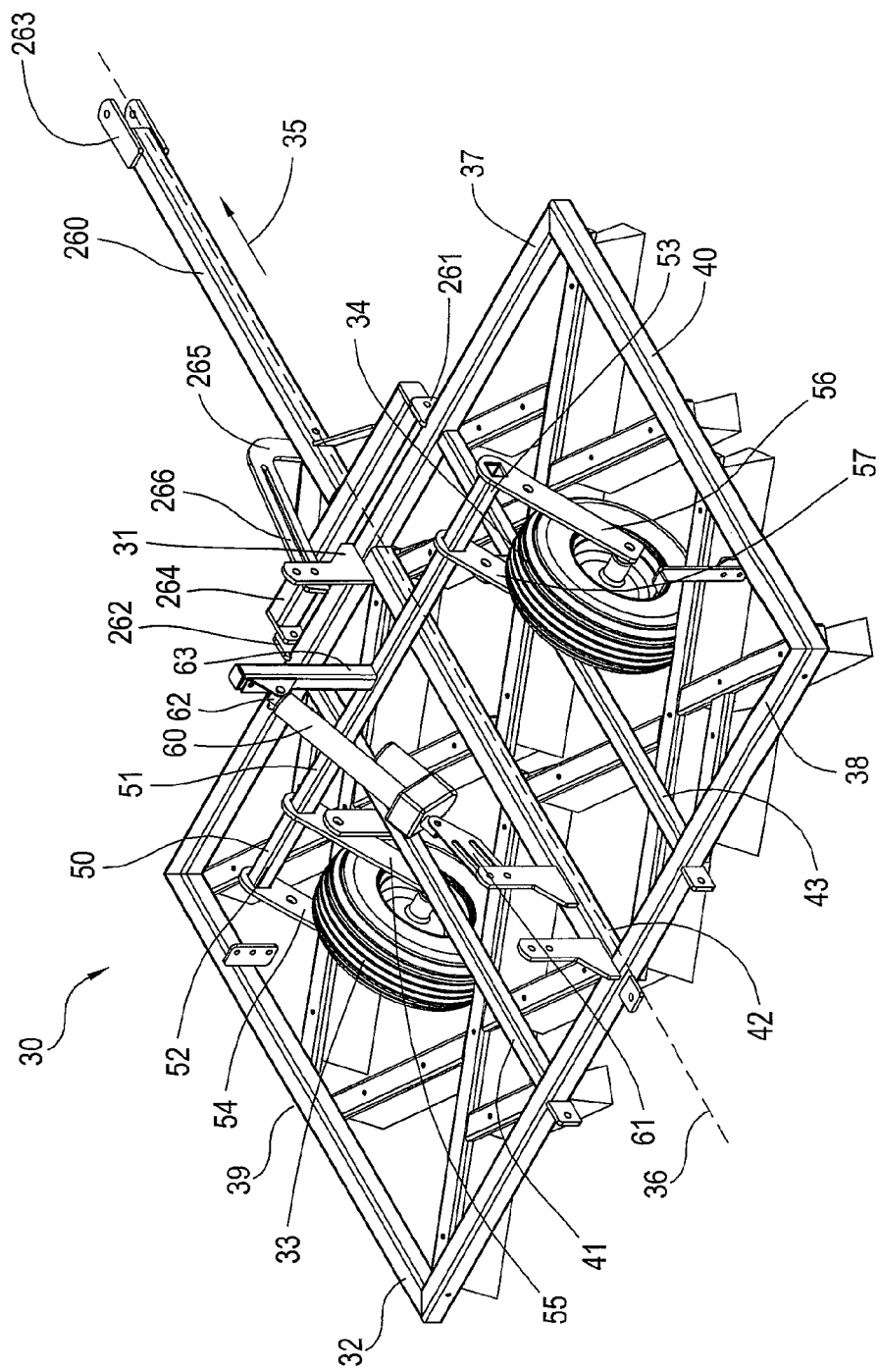
FIG. 1 is the perspective front view of the first alternative embodiment of a grass brush vehicle.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 16:
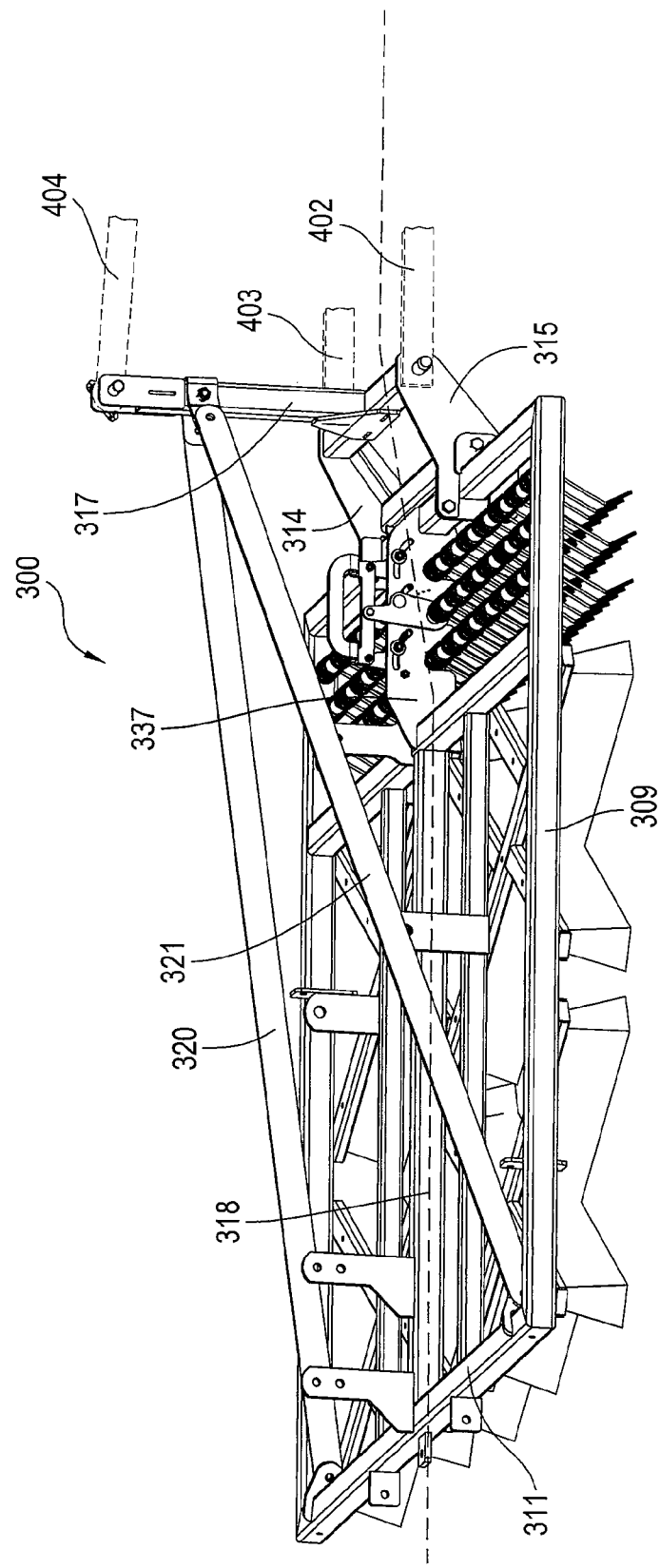
FIG. 16 is side perspective view of the preferred embodiment of the Symmetrical Brush Pattern Groomer with Integrated Spring Tine Rake.
Figure 17:
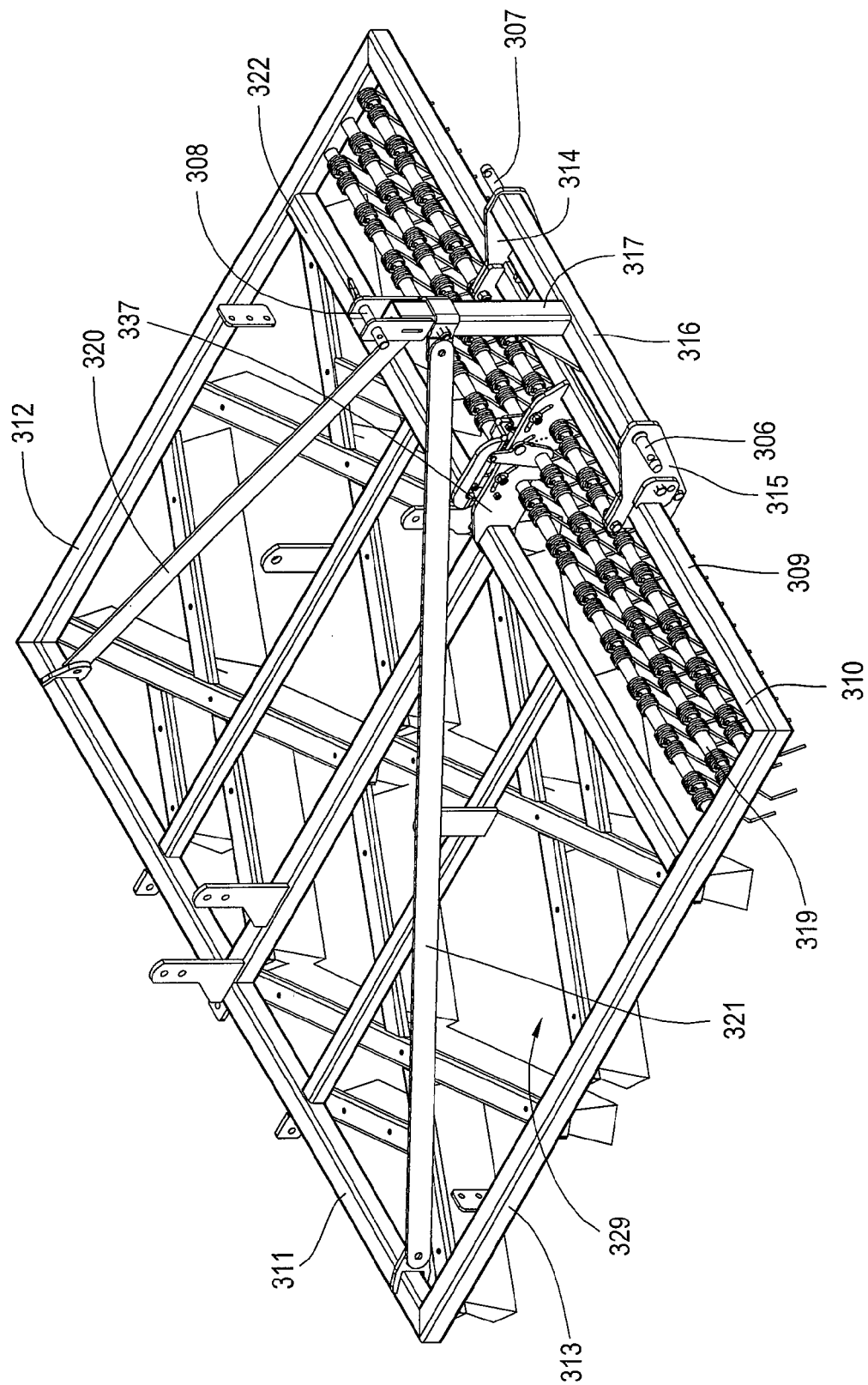
FIG. 17 is a front perspective view of the front of the Groomer of FIG. 16.
Figure 18:
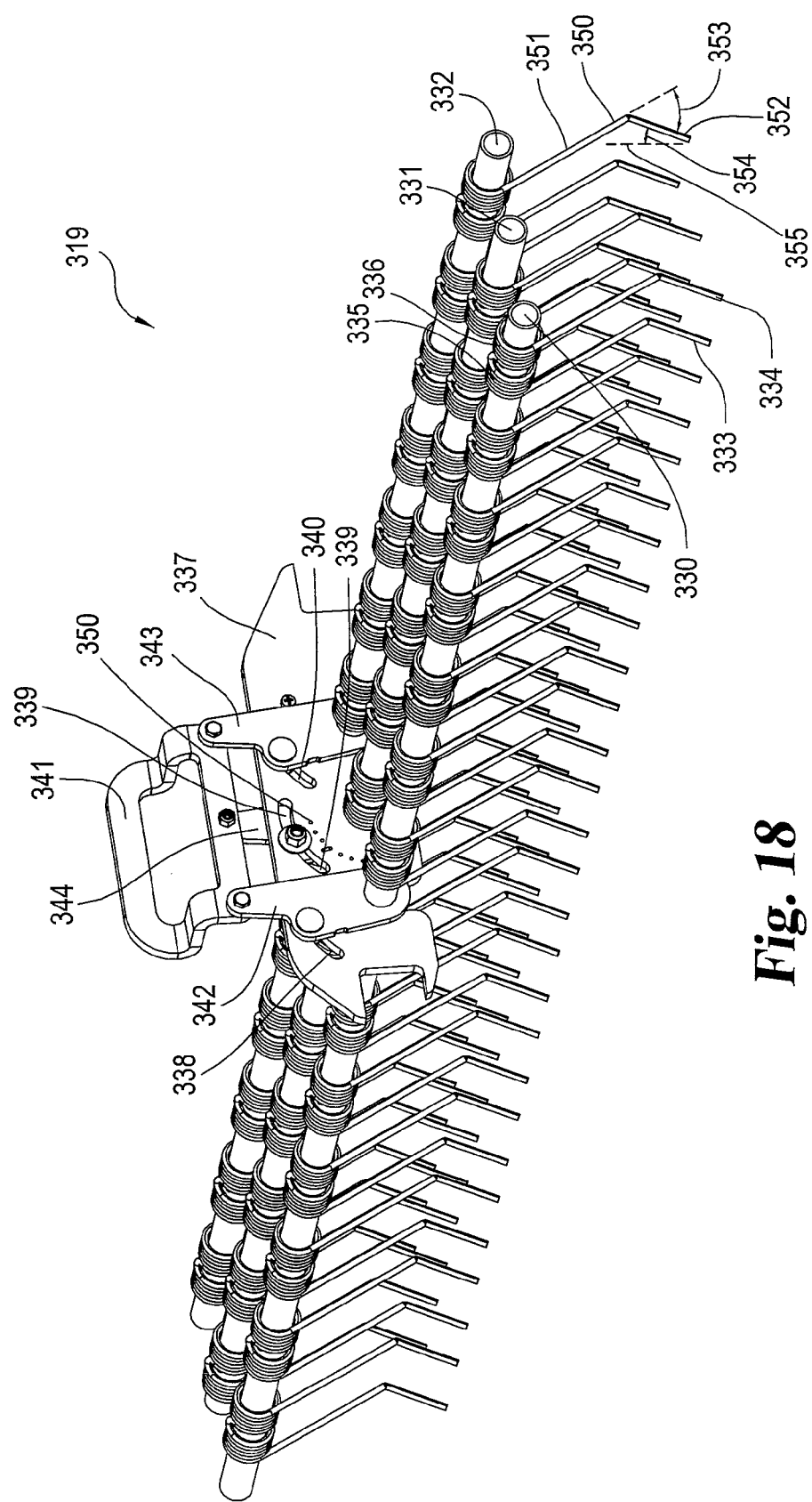
FIG. 18 is an enlarged, front perspective view on the tine assembly removed from the Groomer shown in FIG. 16.
Figure 19:
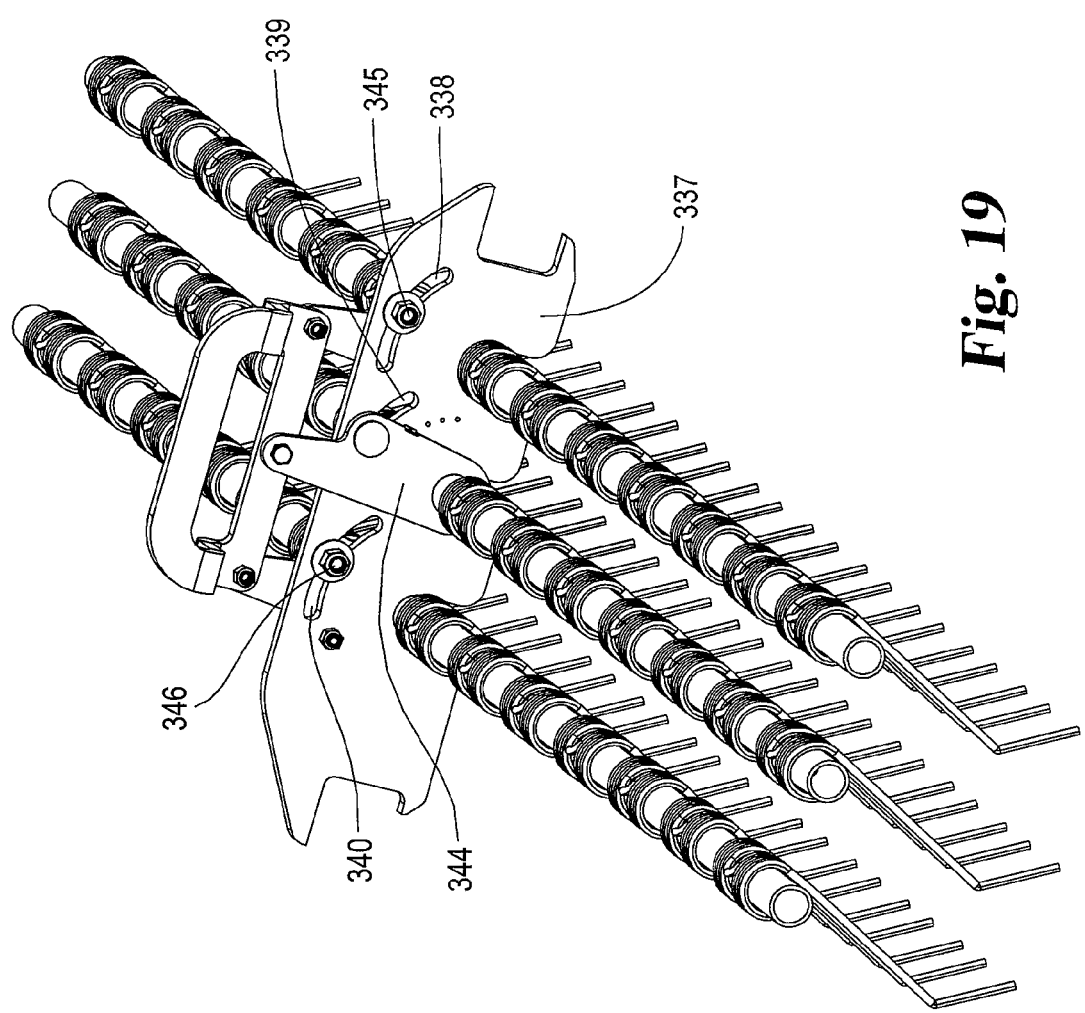
FIG. 19 is a side perspective view of the tine assembly of FIG. 18.

Referring now more particularly to FIG. 1, there is shown the first alternative embodiment a brush vehicle 30 to be removably attached to and towed by a conventional powered vehicle whereas in FIG. 16 there is shown the preferred embodiment of the brush vehicle 300. Two methods are used to pull vehicles 30 and 300, namely, a drawbar version with the brush vehicle having wheels, and a three point hitch version with the brush vehicle not having wheels. Either pulling version may be used with either vehicle 30 and 300.

In FIG. 1, the brush vehicle is shown as having wheels and connected to the drawbar version extending rearwardly from the powered vehicle. The powered vehicle may be a gasoline powered or battery operated cart or tractor and includes for the FIG. 1 version, a rearwardly extending tow bar 260 removably connectable to upright member 31 and brackets 261 and 262 fixedly attached to a rectangular frame 32 of the brush vehicle. The drawbar 260 has a proximal end 263 pivotably attached to a tongue extending rearwardly from the powered vehicle. The distal end of the drawbar has a cross member 264 with opposite ends pivotably attached to flanges 261 and 262 in turn fixedly attached to the rectangular frame 32. An L-shaped arm 265 is fixedly attached to the drawbar and has a distal end 266 pivotably attached at selectable positions along the upstanding member 31. The ultraviolet lights and tines are thereby adjusted to perform consistently regardless of the height of the rearwardly extending tongue on the powered vehicle relative to the turf.

The brush vehicle includes a pair of wheels 33 and 34 rotatably mounted to the brush vehicle frame 32. The wheels are designed to extend downwardly contacting the ground thereby elevating the brushes apart from the ground. The wheels may be pivoted upward so that the brushes rest atop the ground. The powered vehicle is operable to pull the brush vehicle 30 across a golf green, fairway or other supporting surface in the direction of arrow 35 along the axis of movement 36.

Brush vehicle frame 32 includes a front member 37 and rear member 38 fixedly attached to side members 39 and 40 forming the rectangular frame. Three parallel members 41, 42 and 43 also are parallel to the side members 39 and 40 and have their front ends fixedly attached to front member 37 while the rear ends of the three members are fixedly attached to the rear member 38. Members 41-43 provide rigidity and strength to the rectangular frame. Center member 42 extends, along the axis of movement 36 and bisects the rectangular frame. Member 41 is positioned between member 42 and side member 39, whereas member 43 is positioned between member 42 and side member 40.

Wheels 33 and 34 are rotatably mounted to a wheel frame 50, in turn, pivotally mounted to brush vehicle frame 32. Wheel frame 50 has a rod shaped member 51 with opposite end portions 52 and 53. A pair of parallel brackets 54 and 55 has first ends fixedly attached to end portion 52 of rod shaped member 51 and opposite ends to which wheel 33 is rotatably mounted. Likewise, a pair of parallel members 56 and 57 has ends fixedly attached to end portion 53 of rod shaped member 51 and opposite ends to which wheel 34 is rotatably mounted. An actuator 60 has a proximal end movably mounted to bracket 61 fixedly attached to frame 32. The actuator 60 has an extendible rod 62 with a distal end attached to an upwardly extending arm 63 having a bottom end fixedly attached to the rod shaped member 51. Actuator 60 may be a standard pneumatic or hydraulic cylinder motor or any other number of conventional devices including a worm gear device. The actuator is positioned so that when rod 62 is extended, the wheels are caused to pivot upwardly thereby allowing the brushes to contact the ground for the grooming operation. Further, retraction of rod 62 causes the wheels to pivot downward thereby separating the brushes apart from the ground and allowing the brush vehicle to be transported across ground without the brushes being in contact with the ground.

Figure 3:
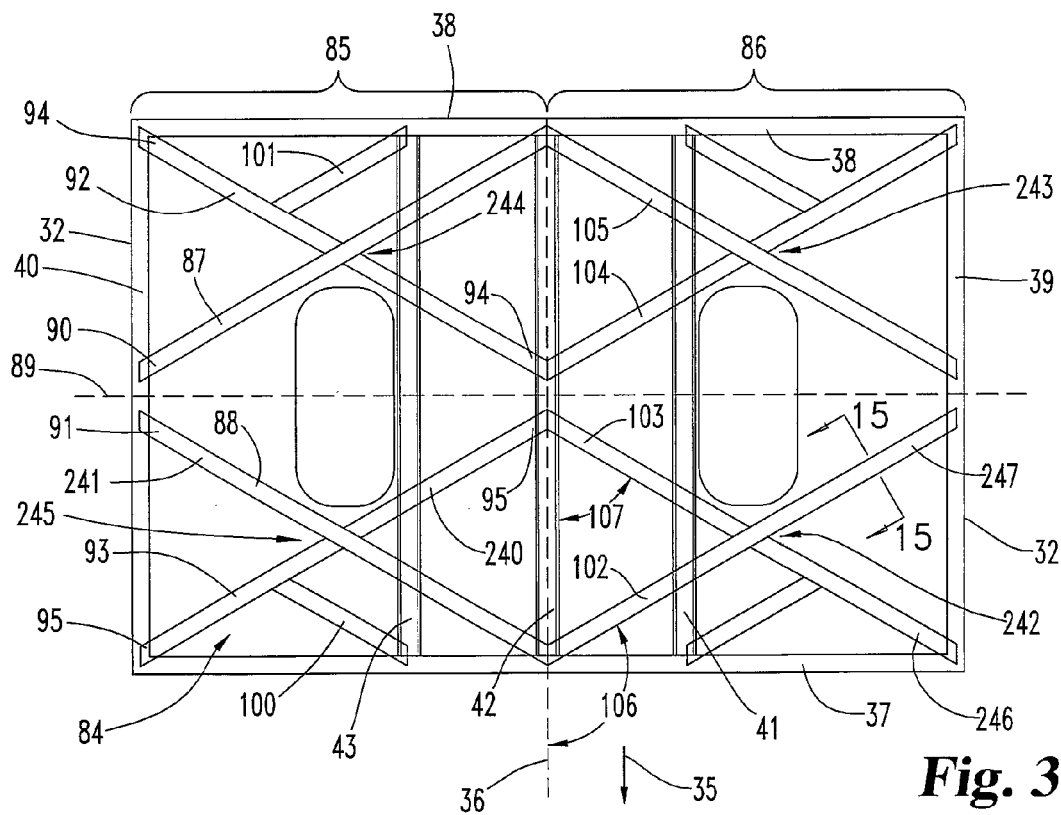
FIG. 3 is an enlarged top view of the first alternative embodiment of the brush pattern utilized with the vehicle of FIG. 1.

FIGS. 3-14 illustrate the various brush patterns for arranging the brushes to extend downwardly from the rectangular frame 32. FIG. 3 illustrates the first alternative embodiment of the brush pattern and is in accordance with the brush pattern shown in the perspective view of the brush vehicle in FIG. 1. FIGS. 4-14 show further alternate embodiments of the brush pattern.

All of the brush patterns disclosed herein includes the essential requirement that each grass blade is pushed back and forth by at least four brushes. Further, the axis of movement 36 is a longitudinal axis of movement for the brush vehicle and provides an axis of symmetry wherein half of the brush pattern on one side of the axis is a mirror image of the remaining half of the brush pattern on the opposite side of the axis. That is, by mirror image is meant that if the brush pattern is divided into a left segment 85 (FIG. 3) and a right segment 86 along axis 36 and then if one segment is pivoted over on its edge adjacent axis 36 and on top of the remaining segment, then the patterns of the two segments are identical.

Figure 2:
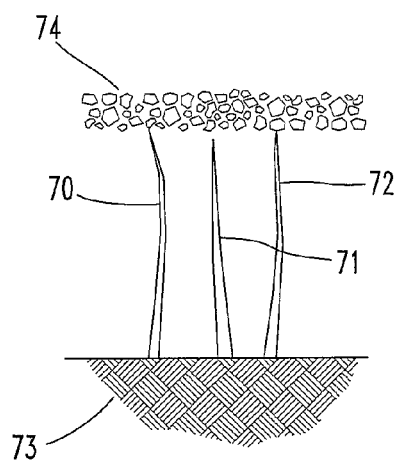
FIG. 2 is a fragmentary cross sectional view illustrating top dressing material atop grass blades extending outwardly from the ground.

FIG. 2 illustrates a few grass blades extending upwardly from the ground. Three blades 70-72 are shown extending upwardly from ground 73 which may be golf green, fairway or other supporting surface. Top dressing material 74 is positioned atop the distal ends of the grass blades with the brush vehicle pushing the blades in one direction relative to the axis of movement 36 and then pushing the grass blades in another direction relative to the same axis in a back and forth motion thereby causing the top dressing material to fall downwardly between adjacent blades. The blades in many cases are tightly positioned together thereby limiting the passage of top dressing material downwardly between blades. By utilizing the brush vehicle disclosed herein and the method of moving the blades, the top dressing material is forced down between the adjacent blades thereby reducing or eliminating the need for moving across the supporting surface repeatedly in order to ensure the top dressing material extends down between blades. A typical top dressing material is sand which is spread atop the golf green, fairway or other supporting surfaces. The golf green is essentially unplayable if the sand remains atop the grass blades and thus it is imperative that the sand be forced downwardly between blades so that a golf ball is supported only by the blades and not by sand. In many occasions, it is necessary to manually brush and rake the sand across the golf green thereby adding to the time and expense of readying the golf green for play.

Such can be accomplished with a single pass across the golf green utilizing the brush vehicle and method disclosed herein.

Figure 15:
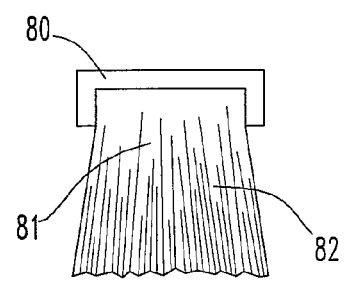
FIG. 15 is an enlarged cross-sectional view taken along the line and viewed in the direction of arrows 15-15 of FIG. 3.

FIG. 3 is an enlarged top plan view of the first alternative embodiment of the brush vehicle of FIG. 1 with the wheels, actuator and tow bar removed from the view to more clearly illustrate the arrangement of the brushes. In the first alternative embodiment, the rectangular frame 32 (FIG. 3) includes an overall length of 48 inches along the axis of movement 36. The width of the rectangular frame in the embodiment of FIG. 3 extending from side member 39 to side member 40 is 72 inches. The brushes are held by brush holders, in turn, affixed to the bottom of rectangular frame 32. For example, a cross sectional view of brush holder 80 and brush 81 is shown in the cross sectional view taken along a line and viewed in the direction of arrow 15-15 of FIG. 3. The brush holder may take any shape or configuration in order to hold the brush that extends downward. For example, in. FIG. 15, brush holder 80 has a downwardly opening C-shape cross section with the top end of brush 81 removably affixed thereto. Brush 81 includes downwardly extending bristles 82 to engage the top dressing material resting atop the golf green, fairway other supporting surface. Brush holder 80 is then affixed to and beneath rectangular frame 32.

The brushes for each one of the embodiments disclosed herein are arranged in a pattern extending on opposite sides of the longitudinal axis of movement 36 which is also axis of symmetry. With half of the brushes located on one side of the longitudinal axis 36 being arranged as a mirror image of the remaining half of the brushes located on the side of a longitudinal axis of movement opposite the one side. Thus, pattern 84 consist of a first pattern 85 located to the left of axis 36 as viewed in FIG. 3 and pattern 86 which is located to the right of axis 36 as viewed in FIG. 3. Pattern 85 includes a first brush holder 87 extending from side member 40 to axis 36 where it is affixed at the junction of rear member 38 and member 42. A second brush holder 88 has its opposite ends affixed to side member 40 and member 42. The outer ends 90 and 91 of holders 87 and 88 are joined at the widthwise middle axis 89 which is arranged perpendicular to the longitudinal axis 36. Further, a pair of brush holders 92 and 93 have outer ends 94 and 95 joined respectively to the adjacent ends of rear member 38 and side member 40 and the adjacent ends of front member 37 and side member 40. The inner ends 94 and 95 of holders 92 and 93 are joined to the middle strengthening member 42 on opposite sides of axis 89. Last, a short leading brush holder 100 and a short trailing brush holder 101 have outer ends attached respectively to front member 37 and rear member 38 with the opposite inner ends of brush holders 100 and 101 attached respectively to brush holders 93 and 92.

Pattern 84 is designed so that each blade of grass located beneath pattern 84 is contacted by at least four separate brushes as rectangular frame 32 passes completely over and pass each grass blade located there beneath. For example, as brush vehicle 30 moves in the direction of arrow 35 (FIG. 1) along the axis of movement 36, a blade of grass will first pass beneath front member 37 and then be pushed and moved at least four separate times by brushes before the blade passes past, rear member 38 and apart from pattern 84. As an example, as a blade of grass passes beneath member 37, with continued movement of frame 32 in the direction of arrow 35, the blade will be pushed and moved in sequential fashion as the blade passes beneath the brushes held by holders 102, 103, 104 and 105. The brush extending downwardly from holder 102 will push the grass blade away from axis 36 since the brush and holder extends rearwardly from the front end member 37 toward the rear end member 38. Brush holder 102 and its associated brush are arranged at an angle 106 relative to axis 36 which is greater than 90 degrees but less than 180 degrees. As the grass blade is contacted by the brush depending or extending downwardly from holder 103, the same grass blade will be pushed back toward axis 36 since the brush extending downwardly from holder 103 is arranged at an approximate angle 107 of less than 90 degrees but more than 0 degrees. The grass blade is therefore pushed in one direction and then in a generally opposite direction giving a back and forth motion to the blades allowing the sand located atop the distal ends of the grass blades to move towards the grass blade roots. Similarly, the holder 104 is arranged at an angle relative to axis 36, the same as angle 106, whereas holder 105 is arranged, at an angle relative to axis 36, the same as angle 107. Thus as the grass blade passes from the brush extending downward from holder 103 and is contacted by the brush extending downwardly from holder 104, the grass blade is pushed in a direction away from axis 36. Similarly, when the grass blade passes from beneath the brush extending downward from holder 104 and is contacted and pushed by the brush extending downwardly from holder 105, the grass blade is pushed toward axis 36 thereby repeating the back and forth motion.

Figure 4:
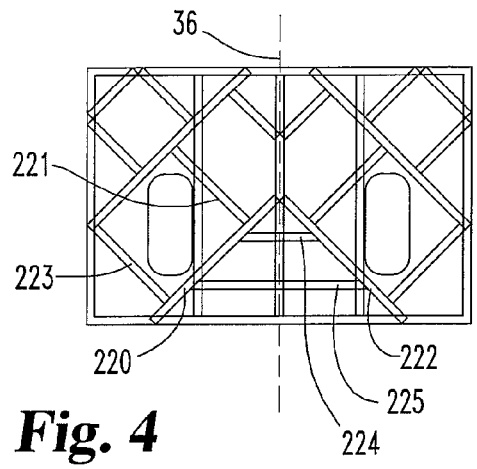
FIG. 4 is a top plan view of the second alternate embodiment of the brush pattern.
Figure 5:
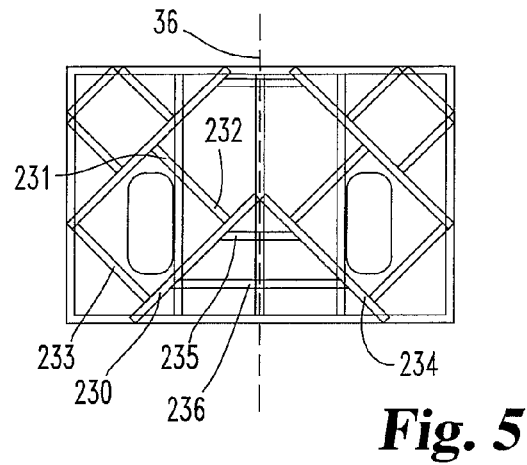
FIG. 5 is a top plan view of the third alternate embodiment of the brush pattern.
Figure 6:
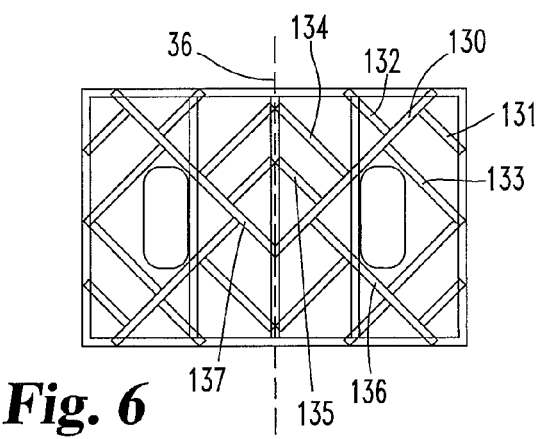
FIG. 6 is a top plan view of the fourth alternate embodiment of the brush pattern.
Figure 7:
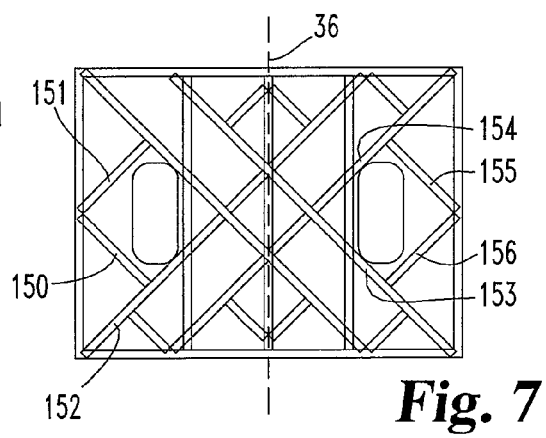
FIG. 7 a top plan view of the fifth alternate embodiment of the brush pattern.
Figure 8:
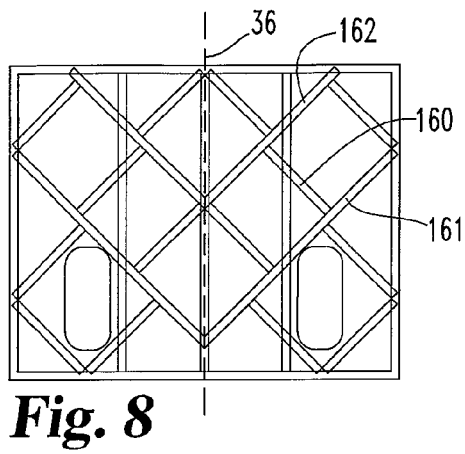
FIG. 8 a top plan view of the sixth alternate embodiment of the brush pattern.
Figure 9:
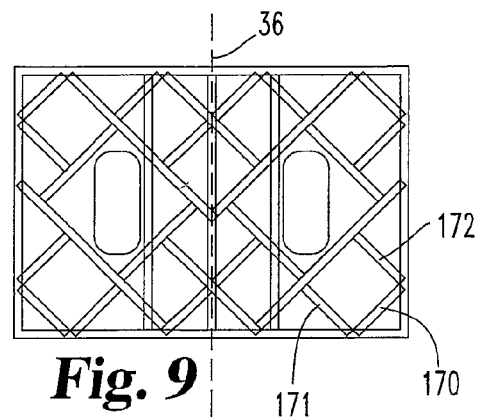
FIG. 9 is a top plan view of the seventh alternate embodiment of the brush pattern.
Figure 10:
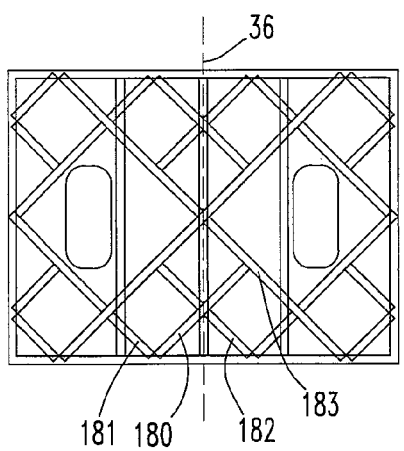
FIG. 10 is a top plan view of the eighth alternate embodiment of the brush pattern.
Figure 11:
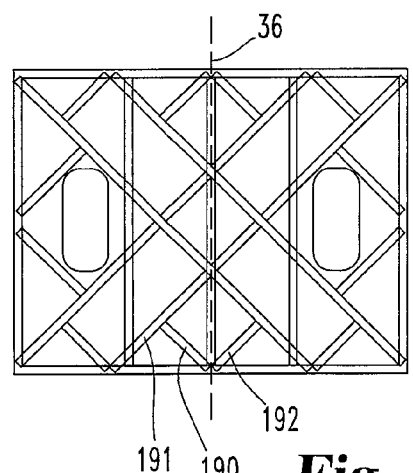
FIG. 11 is a top plan view of the ninth alternate embodiment of the brush pattern.
Figure 12:
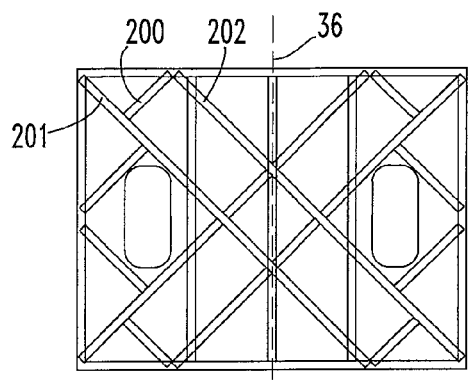
FIG. 12 is a top plan view of the tenth alternate embodiment of the brush pattern.
Figure 13:
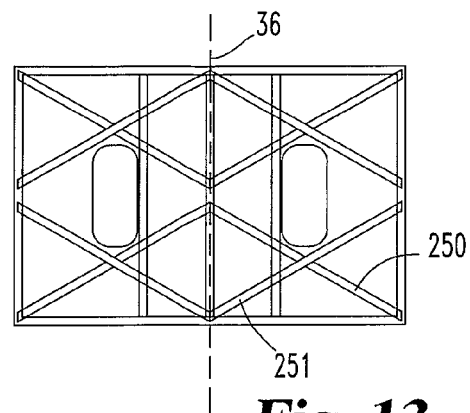
FIG. 13 is a top plan view of the eleventh alternate embodiment of the brush pattern.
Figure 14:
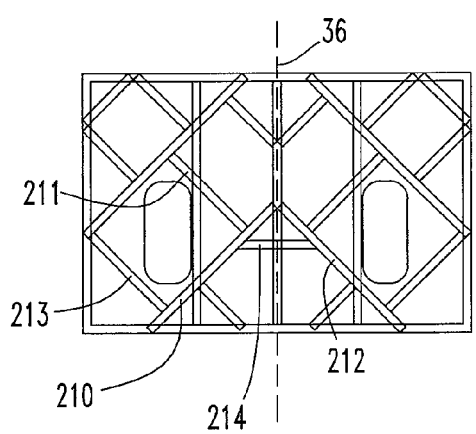
FIG. 14 is a top plan view of the twelfth alternate embodiment of the brush pattern.

The brush patterns illustrated in FIGS. 3-45 are identical with respect to the brush pattern located on one side of the longitudinal axis of movement being a mirror image of the brush pattern located on the opposite side of the longitudinal axis of movement. Further similarities exist. For example, all of the brushes in the patterns illustrated in FIGS. 6-12 are arranged perpendicular relative to the adjacent brush in which they are in contact. In FIG. 6, the brush 130 extending downwardly from the holder is arranged perpendicularly relative to the brushes extending downwardly from holders 131-137. In FIG. 7, brush 150 is perpendicularly arranged with respect to brushes 151 and 152, whereas in FIG. 8, brush 160 is perpendicularly arranged with respect to brushes 161 and 162. In FIG. 9, brush 170 is perpendicularly arranged with respect to brushes 171 and 172, whereas in FIG. 10, brush 180 is perpendicularly arranged with respect to brushes 181, 182 and 183. Brush 190 (FIG. 11) is perpendicularly arranged with respect to brushes 191 and 192, whereas in FIG. 12, brush 200 is perpendicularly arranged with respect to brush 201 and brush 202. The patterns shown in FIGS. 4, 5 and 14 include brushes that are generally perpendicularly with respect to adjacent brushes that they are in contact with although additional brushes are included that are not perpendicular to the adjacent brush. For example, brush 210 in the FIG. 14 pattern is arranged perpendicularly with respect to brushes 211-213 but acutely arranged with respect to brush 214. Similarly, in the FIG. 4 pattern, brush 220 is perpendicularly arranged with respect to brushes 221-223 but acutely arranged with respect to brushes 224 and 225. Brush 230 in FIG. 5, is perpendicularly arranged with respect to end 232 of brush 231 and the ends of brushes 233-234 and acutely arranged with respect to brushes 235 and 236. The brush patterns illustrated in FIGS. 3 and 13 are unique, with respect to the other brush patterns disclosed herein in that brushes in contact with each other are obliquely arranged with respect to each other. Thus, in. FIG. 3, brushes 240 and 241 are obliquely arranged with respect to each other and brushes 250 and 251 in FIG. 13 are obliquely arranged with respect to each other. The brush patterns of FIGS. 3-14 each have a width of 72 inches.

The patterns shown in FIGS. 4-12, 14 each include at least one square brush pattern on each side of the longitudinal axis as a result of the brushes being perpendicular with respect to each other. For example, a square pattern of brushes is formed on the right side axis of longitudinal movement in FIG. 7 with the square brush pattern being composed of brushes 153-156. Since the right side of the brush pattern as viewed in FIG. 7 is a mirror image of that pattern to the left side of the axis of movement, a similar square brush pattern is located on the opposite side of the axis.

The brush patterns shown in FIGS. 3 and 13 are distinguishable from the other brush patterns disclosed herein in that at least two brush configurations forming an X are located on each side of the longitudinal axis of movement. For example, brushes 246 and 247 (FIG. 3) form a single X brush pattern 242 and the same is repeated by two separate brushes forming X configured brush pattern 243, both of which are located on the right side of the longitudinal axis of movement 36. Similarly, X configurations are formed by X configurations 244 and 245 formed by intersecting brushes located on the left side of the longitudinal axis of movement. The same type of X configurations are included in the brush patterns of FIG. 13.

The method of working the sand down between the grass blades on the golf green includes providing brushes that extend downwardly on a frame of a movable vehicle. The longitudinal axis of the vehicle extends from the rear end of the frame to the front end and forms an axis of movement for the vehicle. A pair of wheels are located between the front end and rear end. Next, the brushes are positioned in patterns to have at least four separate brushes arranged in a pattern in order that each grass blade that passes beneath the brushes is contacted and pushed at least four times in opposite directions. The brushes are placed in sequential order so that each grass blade is contacted by a separate brush at a time. The method includes distributing the top dressing material, such as sand, atop the golf green with the sand resting atop the distal ends of the grass blades. The vehicle is then moved across the golf green along its longitudinal axis of movement. The grass blades are contacted with the brushes while the vehicle is moving across the golf green along the axis. The brushes contact the grass blades brushing the blades back and forth beneath the pattern of brushes. First, the blades within a four brush pattern are contacted and pushed at a first angle relative to the longitudinal axis of movement and then contacted and pushed at a second angle relative to the longitudinal axis which is different from the first angle. Third, the blades are contacted again and pushed at a third angle relative to the longitudinal axis which is different from the second angle and then the brushes contact the blades at a fourth angle relative to the longitudinal axis different from the third angle so that the sand is eventually worked down between the blades. Whereas, the first angle and third angle are equal, the second and fourth angles are equal during the brushing step. In one embodiment of the method, the first, second, third and fourth angle are oblique relative to the longitudinal axis. The notable exception in practicing the method is that in the brush patterns of FIGS. 4 and 5, there are small brushes at the front end of the brush pattern that are arranged perpendicularly with respect to the longitudinal axis of the movement. In the case of FIG. 4, brushes 224 and 225, and in the FIG. 5 pattern, the brushes 235 and 236 are arranged perpendicularly to the longitudinal axis of the movement. Prior to moving the grass brush vehicle across the golf green, the wheels are pivoted upwardly so that the brushes will rest atop the grass blades. Most importantly, the method includes arranging the brushes on one side of the longitudinal axis of movement which is an axis of symmetry to be a mirror image of the brushes on the side of the longitudinal axis opposite the one side.

The method so described allows the step of contacting each grass blade beneath the pattern with at least four separate brushes in a single pass of the vehicle. The top dressing works downwardly between the grass blades by moving the vehicle across the blades while maintaining contact between the blades and brushes. As the top dressing is worked downwardly, each grass blade is contacted beneath the pattern of brushes with brushes arranged in a pattern so that the pattern has in sequential order at least four brushes whereby each brush in the pattern extends at a different angle relative to the longitudinal axis of the movement different from an adjacent brush within the same pattern thereby pushing the grass blade back and forth so that the top dressing material or sand is eventually worked downwardly between the blades.

The preferred embodiment of the turf comber is shown in FIG. 16. Turf comber 300 has a rectangular frame 309 holding the symmetrical brushes previously described herein and shown in FIGS. 1-15. That is, the brushes shown in FIGS. 16 and 17 for illustration purposes only are replaced with the brushes shown in the FIGS. 1-15. The brushes are held in an identical manner for the preferred embodiment as described for the previously described embodiments. Further, the preferred embodiment of vehicle 300 either includes the wheels 33 and 34 and the wheel, frame 50 along with the actuator 60 in an identical manner as the embodiment of FIG. 1 in which case the tow bar shown in FIG. 1 is utilized or the vehicle or vehicle 300 does not include the wheels, wheel frame and actuator in which case vehicle 300 is attached to a three point hitch of the powered pulling vehicle. FIG. 16 shows the version where vehicle 300 is attached to a three point hitch of the powered pulling vehicle.

Figure 20:
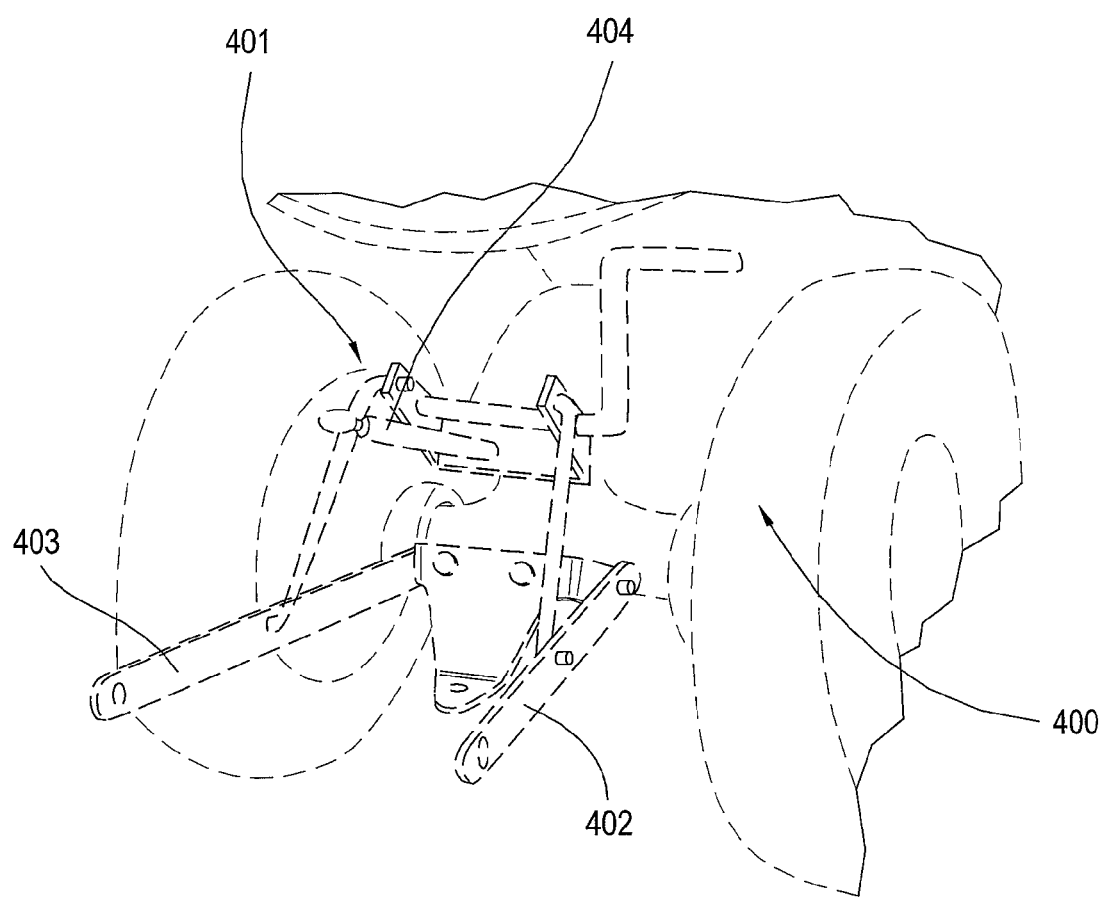
FIG. 20 is a fragmentary rear perspective view of the powered pulling vehicle having a rearwardly extending three point hitch to connect to the mobile Groomer of FIG. 16.

A tractor 400 is partially shown in FIG. 20 and has a traditional three point hitch 401 extending rearwardly therefrom. Hitch 401 has a pair of spaced apart lower attachment arms 402 and 403 having distal ends connected to brackets 315 and 314. A top attachment arm 404 has a distal end attached to upstanding post 317. The attachment arms may be removably connected to the rectangular frame of the mobile vehicle 300 by pins or other fasteners. The three point hitch 401 supports the mobile vehicle 300 above ground since vehicle 300 does not have wheels. The tractor is operable by a powered device, such as a cylinder motor, to move the traditional three point hitch 401 up and down thereby controlling the spacing between the turf and the tines/ultraviolet lamps. The prior art three point hitches are often attached to a hydraulic cylinder that can be extended or retracted to adjust the position of the upper pivot allowing for angular adjustment/raising/and lowering of the implement attached.

Turf comber 300 is provided with rows of tines integrated within the turf comber frame. A handle adjustment device is provided to uniformly adjust the rows of tines.

Frame 309 is rectangular in configuration having a front member 310 and a parallel rear member 311 perpendicularly joined to a pair of side members 312 and 313. The pair of spaced apart, brackets 314 and 315 are fixedly joined to front member 310 and project forwardly mountingly receiving a cross mounting bar 316 with opposite ends positioned inwardly and adjacent the brackets. Post 317 has a bottom end fixedly mounted atop bar 316 and has a top end.

Strengthening members or ribs 320 and 321 have forward ends connected to post 317 near the top end of post 317 and rear ends connected to rear member 311 of frame 309. Members 320 and 321 extend in a downward direction from post 317 to rear member 311. Further members 320 and 321 diverge apart as the members extend from post 317 toward rear member 311. In the event, the three point hitch is moved upwardly, then the lifting force is applied to the rear portion of the frame 309 through post 317 and members 320 and 321 and also to the front portion of frame 309 through arms 402 and 403 via brackets 315 and 314. The structural integrity of frame 309 is thereby preserved A tine assembly 319 (FIG. 17) is mounted to frame 309 adjacent the front end portion 310 with the brushes located aft of the tine assembly. A cross member 322 has opposite ends attached to frame side portions 312 and 313 and separates assembly 319 from the brushes. Assembly 319 includes three parallel tine rods 330, 331 and 332 (FIG. 18) that have opposite ends rotatably mounted to side members 312 and 313 with commercially available spring-biased tines mounted to the tine rods. The tines are arranged in pairs. For example, tine 333 and 334 are respectively attached to a pair of spring coils 335 and 336 through which rod 330 extends. Coils 335 and 336 are connected together. A conventional fastening device extends over a portion of coils 335 and 336 and into rod 330 thereby securely mounting the coils and attached tines to the rods. Similarly, the remaining tines are mounted to rods 330, 331 and 332.

Rods 330, 331 and 332 extend freely through plate 337 fixedly mounted to front member 310 and cross member 322 extending between and attached to side members 312 and 313 of frame 309. A handle 341 (FIGS. 18 and 19) is positioned above rods 330, 331 and 332 and has two downwardly extends legs 342 and 343 through which rods 330 and 332 respectively extend. Legs 342 and 343 are positioned adjacent and on one side of plate 337. A third leg 344 is attached to handle 341 and extends downwardly adjacent but on a side of plate 337 opposite of the side whereat legs 342 and 343 are located. Rod 331 extends through leg 344. Legs 342-344 have top ends rotatably mounted to handle 341 and bottom ends fixedly mounted to rods 330-332 thereby allowing the handle to move relative to the three legs whereas the bottom ends of the legs move as a unit with rods 330-332 with relative motion between the legs either limited or prevented. Three identical curved slots 338, 339 and 340 extend through plate 337 with a separate fastener extending through each slot and through a leg of handle 341. That is, fasteners 345 and 346 extend through respectively slots 338 and 340 and legs 342 and 343 whereas a separate fastener extends through the middle slot 339 and leg 344. The fasteners extend loosely relative to plate 337 allowing the fasteners to be moved between the opposite ends of the slots as handle is moved toward and away from the towing vehicle. Movement of handle 341 results in legs 342-344 moving with rods 330-332 thereby controlling the penetration of the bottom ends of the tines into the turf. As an example of the movement, referring to FIG. 18, with the handle and three legs moving to the left and the fasteners moving leftward in their respective slots, the three rods rotate counterclockwise causing the distal ends of the tines to approach the vertical. As the handle is moved to the right as viewed in FIG. 18, the tine distal ends move away from the vertical. Indicia 350 (FIG. 18) is provided on opposite sides of plate 337 providing an indication of the position of the fasteners extending through the plate and thus, the positioning of the tines.

Each tine has a downwardly extending portion arranged at an angle with respect to its bottom distal end portion. For example, tine 350 has a downwardly extending portion 351 arranged at angle 353 to its integrally connected distal end portion 352. Distal end portion 352 is straight and arranged at angle 354 relative to vertical axis 355. By rotating the rods, angle 354 may be adjusted over a range of approximately 30 degrees.

In the event aggressive combing of the turf is desired, then the rods are rotated until angle 354 is zero degrees thereby positioning the bottom end portion parallel to the vertical. In the event a less aggressive combing action is desired, then the rods and tines are adjusted until angle 354 is at its maximum. Notably, movement of handle 341 in a transverse direction to the rods results in simultaneous movement of the rods and tines thereby controlling the penetration of the tines into the grass blades. The tines contact the blades to move the blades upwardly if mated down with the brushes contacting the blades subsequently. The side frame portions 312 and 313 (FIG. 17) are fixedly joined to the front end portion 310 and rear end portion 311 defining a rectangular interior 329. The brushes and tines are located within interior 329 providing an integrated brush-tine assembly.

While the invention has been illustrated and described in detail in the drawings and foregoing description, the same is to be considered as illustrative and not restrictive in character, it being understood that only selected embodiments have been shown and described and that all changes and modifications that come within the spirit of the invention are desired to be protected.

What is claimed is:

1. An integrated brush-tine groomer connectable to a three-point hitch of a towing vehicle for moving said groomer across a surface and working top dressing material into grass blades extending therefrom comprising:

a main frame having a front end and a rear end with a longitudinal axis of movement extending from said front end to said rear end, said frame movable across a surface along said longitudinal axis of movement; and, brushes mounted to said frame and including bristles extending downward to work top dressing material between grass blades extending from said surface as said frame is moved across the grass blades, and wherein:

said brushes are arranged in a first pattern extending on opposite sides of said longitudinal axis of movement which is an axis of symmetry of said first pattern with half of the brushes located on one side of said longitudinal axis of movement being arranged as a mirror image of the remaining half of brushes located on a side of said longitudinal axis of movement opposite of said one side, and, tines mounted to said frame to contact said grass blades and cooperatively with said brushes work top dressing material between said grass blades;

a tine assembly including parallel members extending across said frame and having said tines mounted thereto, and further including a manual adjuster connected to said parallel members and movably mounted to said frame to simultaneously move said parallel members and tines thereon to control penetration of said tines into said grass blades; and wherein:

said tine assembly includes a plate with slots and also includes fasteners extending through said manual adjuster and into said slots for controlling movement of said parallel members and penetration of said tines; and, said manual adjuster includes a hand graspable portion and a pair of spaced apart legs with a third leg located therebetween, said pair of legs and third leg are movably mounted to said hand graspable portion and include distal ends connected to said parallel members limiting motion between said pair of legs and third leg with said parallel members allowing rotation of said parallel members when said hand graspable portion moves transversely to said parallel members.

2. An integrated brush-tine groomer for working top dressing material into a surface having grass blades extending upwardly therefrom comprising:

a frame with a pair of side frame portions which are arranged as a first side portion and a second side portion with said frame further having a front frame portion and rear frame portion connected together to said side frame portions, said frame movable across a supporting surface with a longitudinal axis of movement;

brushes mounted to said frame and including bristles extending downward to work top dressing material between grass blades extending from said surface as said frame is moved across the grass blades, said brushes are located between said side frame portions and said front frame portion and said rear frame portion, said brushes are arranged in a pattern extending on opposite sides of said longitudinal axis of movement which is an axis of symmetry of said pattern with half of the brushes located on one side of said longitudinal axis of movement being arranged as a mirror image of the remaining half of brushes located on a side of said longitudinal axis of movement opposite of said one side; said pattern angularly positioning said brushes along said longitudinal axis of movement to contact each grass blade beneath said pattern as said frame passes completely over and past said grass blades so each of said grass blades located beneath said pattern is contacted four times pushing each of said grass blades in sequential manner in a first direction, a second direction opposite said first direction, a third direction opposite said second direction and a fourth direction opposite said third direction; and, a tine assembly mounted to said frame and located between said side frame portions and said front frame portion and said rear frame portion, said tine assembly including multiple rods extending transverse to said longitudinal axis of movement and movably mounted to and between said side frame portions, said multiple rods each having a first end rotatably mounted to said first side portion and with each of said rods having a second end rotatably mounted to said second side portion, said tine assembly further including tines mounted to said multiple rods and extendable downwardly therefrom to penetrate into said grass blades, said tine assembly further including a tine positioner with a graspable portion with legs having distal ends movably mounted to said frame and fixedly connected to said rods to simultaneously rotate said rods as said graspable portion is moved relative to said frame while said legs pivot relative to said rods and simultaneously move said tines relative to said grass blades to control penetration of said tines into said grass blades; and wherein:

said tine assembly is located adjacent said front frame portion with said brushes located along said longitudinal axis of movement aft of said tine assembly with said tines contacting said grass blades to move said grass blades upwardly if mated down with said brushes contacting said grass blades subsequently;

said frame includes a cross member connected to and extending between said side frame portions and positioned between said tines and said brushes, said tine assembly further includes a plate connected to and extending between said cross member and said front frame portion, said tine assembly has slots in said plate and fasteners extending through said tine positioner and into said slots for controlling movement of said rods and penetration of said tines, said slots have lengths with said fasteners sliding along said lengths as said distal ends pivot.

3. An integrated brush-tine groomer for working top dressing material into a surface having grass blades extending upwardly therefrom comprising:

a frame with a pair of side frame portions and a front frame portion and rear frame portion connected together, said frame movable across a supporting surface with a longitudinal axis of movement;

brushes mounted to said frame and including bristles extending downward to work top dressing material between grass blades extending from said surface as said frame is moved across the grass blades, said brushes are located between said side frame portions and said front frame portion and said rear frame portion, said brushes are arranged in a pattern extending on opposite sides of said longitudinal axis of movement which is an axis of symmetry of said pattern with half of the brushes located on one side of said longitudinal axis of movement being arranged as a mirror image of the remaining half of brushes located on a side of said longitudinal axis of movement opposite of said one side; said pattern angularly positioning said brushes along said longitudinal axis of movement to contact each of said grass blades located beneath said pattern is thereby contacted four times pushing each of said grass blades in sequential manner in a first direction, a second direction opposite said first direction, a third direction opposite said second direction and a fourth direction opposite said third direction; and, a tine assembly mounted to said frame and located between said side frame portions and said front frame portion and said rear frame portion, said tine assembly including multiple rods extending transverse to said longitudinal axis of movement and movably mounted to and between said side frame portions, said tine assembly further including tines mounted to said multiple rods and extendable downwardly therefrom to penetrate into said grass blades, said tine assembly further including a tine positioner connected to said rods to simultaneously rotate said rods and simultaneously move said tines to control penetration of said tines into said grass blades; and said tine assembly is located adjacent said front frame portion with said brushes located along said longitudinal axis of movement aft of said tine assembly with said tines contacting said grass blades to move said grass blades upwardly if mated down with said brushes contacting said grass blades subsequently, and said frame includes a cross member connected to and extending between said side frame portions and positioned between said tines and said brushes, said tine assembly further includes a plate connected to and extending between said cross member and said front frame portion, said tine assembly has slots in said plate and fasteners extending through said tine positioner and into said slots for controlling movement of said rods and penetration of said tines; wherein;

said tine positioner includes a handle and a pair of spaced apart legs with a third leg located therebetween, said legs are movably mounted to said handle and include distal ends connected to said rods with limited motion between said legs and said rods allowing rotation of said rods when said handle moves transversely to said rods.

4. An integrated brush-tine groomer for working top dressing material into a surface having blades extending upwardly therefrom comprising:

a frame with a pair of side frame portions and a front frame portion and rear frame portion connected together, said frame movable across a supporting surface with a longitudinal axis of movement;

brushes mounted to said frame and including bristles extending downward to work top dressing material between blades extending from said surface as said frame is moved across the blades, said brushes are located between said side frame portions and said front frame portion and rear frame portion, said brushes are arranged in a pattern extending on opposite sides of said longitudinal axis of movement which is an axis of symmetry of said pattern with half of the brushes located on one side of said longitudinal axis of movement being arranged as a mirror image of the remaining half of brushes located on a side of said longitudinal axis of movement opposite of said one side, said pattern angularly positioning said brushes along said longitudinal axis of movement to contact each of said blades located beneath said pattern so said blades beneath said pattern are thereby contacted four times pushing each of said blades in sequential manner in a first direction, a second direction opposite said first direction, a third direction opposite said second direction and a fourth direction opposite said third direction; and, a tine assembly mounted to said frame and located between said side frame portions and said front frame portion and said rear frame portion, said tine assembly including multiple rods extending transverse to said longitudinal axis of movement and having opposite ends movably mounted to and between said side frame portions, said tine assembly further including tines mounted to said multiple rods and extendable downwardly therefrom to penetrate into said blades, said tine assembly further including a tine positioner connected to said rods to simultaneously rotate said rods and simultaneously move said tines relative to said blades to control penetration of said tines into said blades; and wherein:

said tine assembly is located adjacent said front frame portion with said brushes located along said longitudinal axis of movement aft of said tine assembly with said tines contacting said blades to move said blades upwardly if mated down with said brushes contacting said blades subsequently, and, said tine positioner includes a handle and a pair of spaced apart legs with a third leg located therebetween, said legs are movably mounted to said handle and include distal ends connected to said rods with limited motion between said legs and said rods allowing rotation of said rods when said handle moves transversely to said rods, said tine assembly includes a plate with slots and also includes fasteners extending through said legs and slidably along said slots for controlling movement of said rods and penetration of said tines.

\* \* \* \* \*